United States Patent
Lund et al.

(10) Patent No.: US 6,480,221 B1
(45) Date of Patent: Nov. 12, 2002

(54) METHOD AND APPARATUS FOR DETERMINING A PROCESS POSITION OF A SCAN LINE IN AN ELECTROPHOTOGRAPHIC MACHINE

(75) Inventors: Mark Edwin Kirtley Lund, Lexington; Daniel Eugene Pawley, Louisville; Earl Dawson Ward, II, Richmond, all of KY (US)

(73) Assignee: Lexmark International, Inc, Lexington, KY (US)

( * ) Notice: Subject to any disclaimer, the term of this patent is extended or adjusted under 35 U.S.C. 154(b) by 0 days.

(21) Appl. No.: 09/567,992

(22) Filed: May 10, 2000

(51) Int. Cl.[7] ............................................. B41J 2/435
(52) U.S. Cl. ..................................... 347/248; 347/234
(58) Field of Search ............................... 347/116, 235, 347/234, 248, 250; 399/38; 250/201.8, 559.06, 559.29, 559.3, 236, 578.1, 208.1, 208.3; 359/204

(56) References Cited

U.S. PATENT DOCUMENTS

| 5,498,869 | A | * | 3/1996 | Appel et al. | 250/236 |
| 5,539,719 | A | * | 7/1996 | Motoi | 250/208.1 |
| 5,694,637 | A | * | 12/1997 | Yoshino et al. | 399/38 |
| 5,786,594 | A | * | 7/1998 | Ito et al. | 250/236 |
| 5,966,231 | A | * | 10/1999 | Bush et al. | 359/204 |
| 5,982,402 | A | * | 11/1999 | Yoshikawa et al. | 347/116 |
| 6,342,963 | B1 | * | 1/2002 | Yoshino | 359/204 |

OTHER PUBLICATIONS

US 6,353,454, 3/2002, Tanimoto et al. (withdrawn)*

* cited by examiner

*Primary Examiner*—Hai Pham
(74) *Attorney, Agent, or Firm*—Taylor & Aust, P.C.

(57) ABSTRACT

A method of determining a position of a laser beam in an electrophotographic machine includes providing a sensor device having a laser beam receiving surface with a first edge and a second edge. The second edge is nonparallel to the first edge. The laser beam is scanned across the receiving surface in a scan direction perpendicular to a process direction. The laser beam intersects each of the first edge and the second edge of the receiving surface during the scanning. A time period between when the laser beam intersects the first edge and when the laser beam intersects the second edge of the receiving surface is measured. A process position of the laser beam along the process direction is calculated based upon the measured time period.

12 Claims, 3 Drawing Sheets

METHOD AND APPARATUS FOR DETERMINING A PROCESS POSITION OF A SCAN LINE IN AN ELECTROPHOTOGRAPHIC MACHINE

BACKGROUND OF THE INVENTION

1. Field of the Invention

The present invention relates to an electrophotographic machine, and, more particularly, to determining a position of a laser beam in an electrophotographic machine, such as a laser printer.

2. Description of the Related Art

In an in-line color laser image printing process, the print medium typically passes through four color developing stations in series, with the colors being black, magenta, cyan and yellow. In order for the multi-color laser printer to print at the same speed as a monochrome laser printer, photoconductive drum exposures must occur for all four colors simultaneously. Thus, alignment of the four color developing stations in both the process direction (feed direction of the print medium) and scan direction (across the page) is critical.

The process location of each scanning laser beam must overlap to prevent color mis-registration in the process direction. Each color must have an adjustment to correct for process direction misalignment because each color has a scanning laser beam following a separate optical path. Although the laser beams can be aligned when the laser printer is first assembled, thermal changes occurring during operation of the laser printer can cause subsequent misalignment of the laser beams.

It is known to use a horizontal synchronization (HSYNC) sensor to determine the location of the start of the scan of the laser beam across the photoconductive drum. The HSYNC sensor has a rectangular photosensitive surface which is placed somewhere in the laser print head near the start of a scan line. When the laser beam strikes the HSYNC sensor surface at the start of a scan line, the photodiode sensor detects the presence of the laser beam and thereby identifies the location of the laser beam. Such rectangular sensors, however, cannot be used to determine a location of the laser beam in the process direction.

What is needed in the art is a low-cost method of aligning multiple laser beams in a process direction of a laser printer such that all of the laser beams can operate simultaneously to thereby achieve the same printing speed as that of a monochrome laser printer.

SUMMARY OF THE INVENTION

The present invention provides a method of real time detection of process direction location of multiple scan lines of a multicolor electrophotographic machine, such as a laser printer.

The invention comprises, in one form thereof, a method of determining a position of a laser beam in an electrophotographic machine. A sensor device having a laser beam receiving surface with a first edge and a second edge is provided. The second edge is nonparallel to the first edge. The laser beam is scanned across the receiving surface in a scan direction perpendicular to a process direction. The laser beam intersects each of the first edge and the second edge of the receiving surface during the scanning. A time period between when the laser beam intersects the first edge and when the laser beam intersects the second edge of the receiving surface is measured. A process position of the laser beam along the process direction is calculated based upon the measured time period.

An advantage of the present invention is that the laser beams of a multicolor electrophotographic machine can be aligned in the process direction in real time while the machine is operating.

Another advantage is that only one sensor is required to detect a laser beam location in both the scan and process directions.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
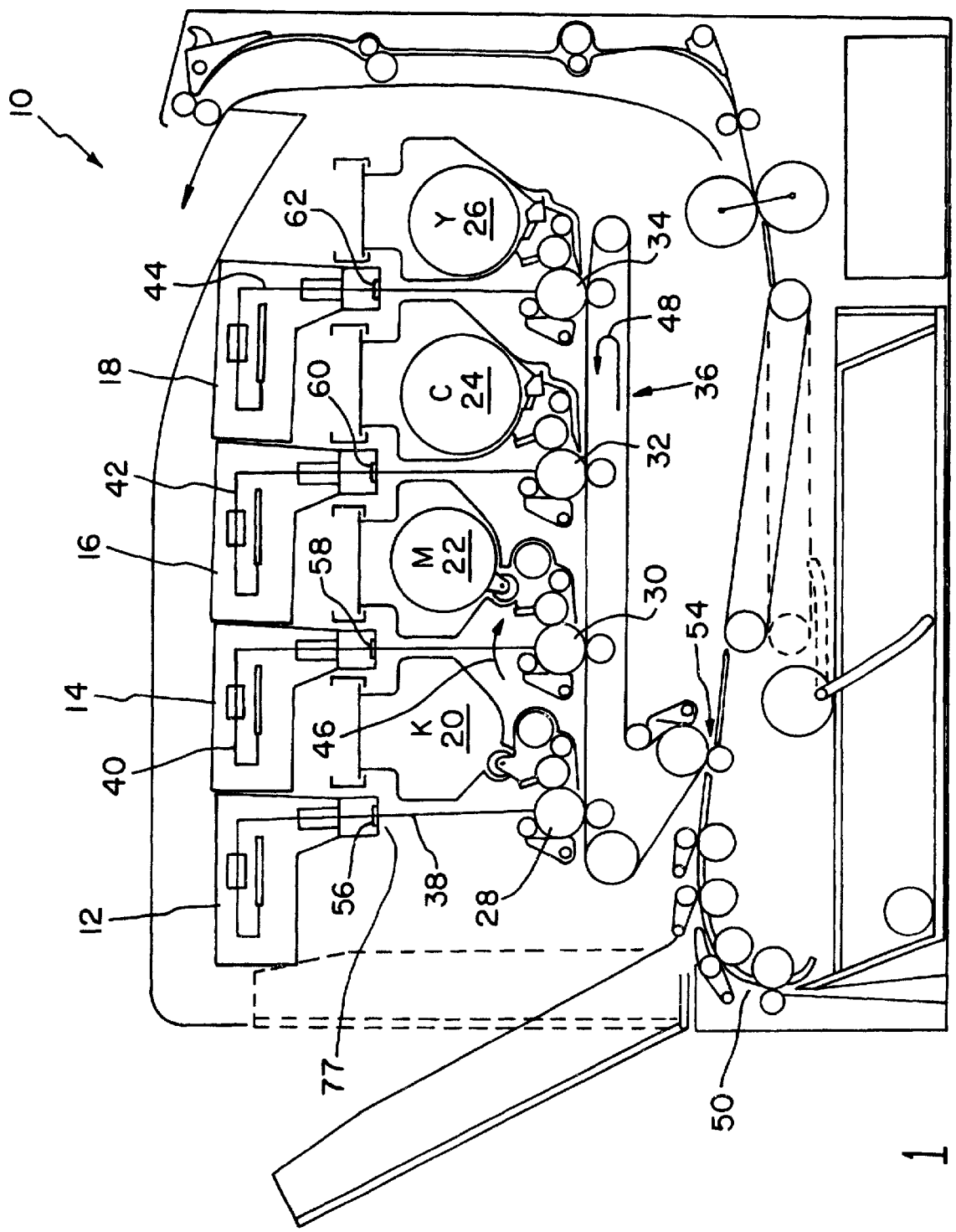
FIG. 1 is a side, sectional view of one embodiment of a multicolor laser printer in which the present invention may be used.

Referring now to the drawings and, more particularly, to FIG. 1, there is shown one embodiment of a multicolor laser printer 10 including laser print heads 12, 14, 16, 18, a black toner cartridge 20, a magenta toner cartridge 22, a cyan toner cartridge 24, a yellow toner cartridge 26, photoconductive drums 28, 30, 32, 34, and an intermediate transfer member belt 36.

Each of laser print heads 12, 14, 16 and 18 scans a respective laser beam 38, 40, 42, 44 in a scan direction, perpendicular to the plane of FIG. 1, across a respective one of photoconductive drums 28, 30, 32 and 34. Each of photoconductive drums 28, 30, 32 and 34 is negatively charged to approximately −900 volts and is subsequently discharged to a level of approximately −200 volts in the areas of its peripheral surface that are impinged by a respective one of laser beams 38, 40, 42 and 44. During each scan of a laser beam across a photoconductive drum, each of photoconductive drums 28, 30, 32 and 34 is continuously rotated, clockwise in the embodiment shown, in a process direction indicated by direction arrow 46. The scanning of laser beams 38, 40, 42 and 44 across the peripheral surfaces of the photoconductive drums is cyclically repeated, thereby discharging the areas of the peripheral surfaces on which the laser beams impinge.

The toner in each of toner cartridges 20, 22, 24 and 26 is negatively charged to approximately −600 volts. Thus, when the toner from cartridges 20, 22, 24 and 26 is brought into contact with a respective one of photoconductive drums 28, 30, 32 and 34, the toner is attracted to and adheres to the portions of the peripheral surfaces of the drums that have been discharged to −200 volts by the laser beams. As belt 36 rotates in the direction indicated by arrow 48, the toner from each of drums 28, 30, 32 and 34 is transferred to the outside surface of belt 36. As a print medium, such as paper, travels along path 50, the toner is transferred to the surface of the print medium in nip 54. The laser beam of each of print heads 12, 14, 16 and 18 impinges upon a respective one of sensor devices 56, 58, 60 and 62, each of which is placed near the end of a scan line of the associated laser beam.

Figure 2:
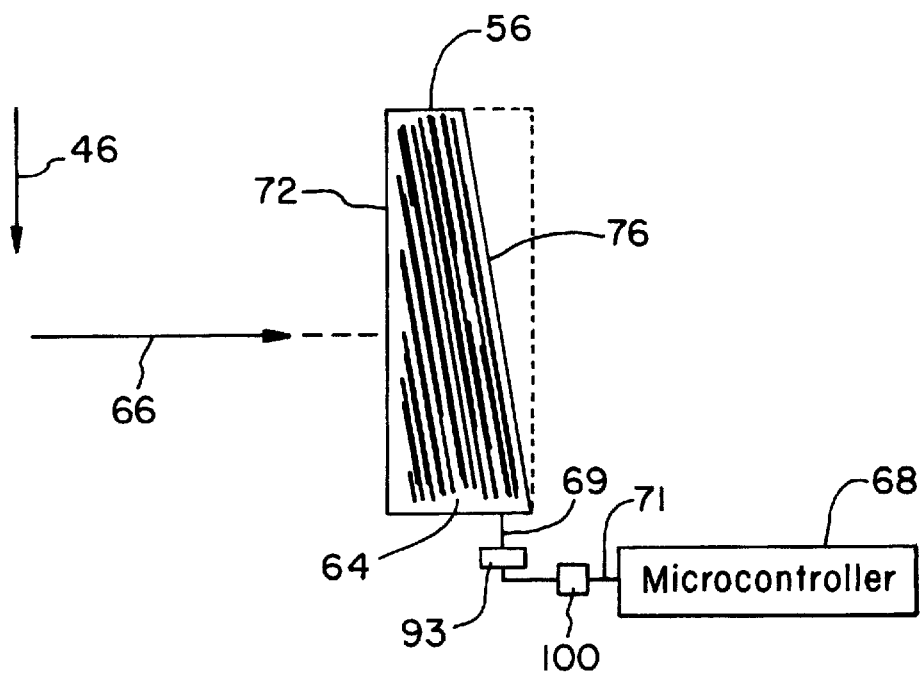
FIG. 2 is a schematic view of one embodiment of a sensor device of the present invention.
Figure 3:
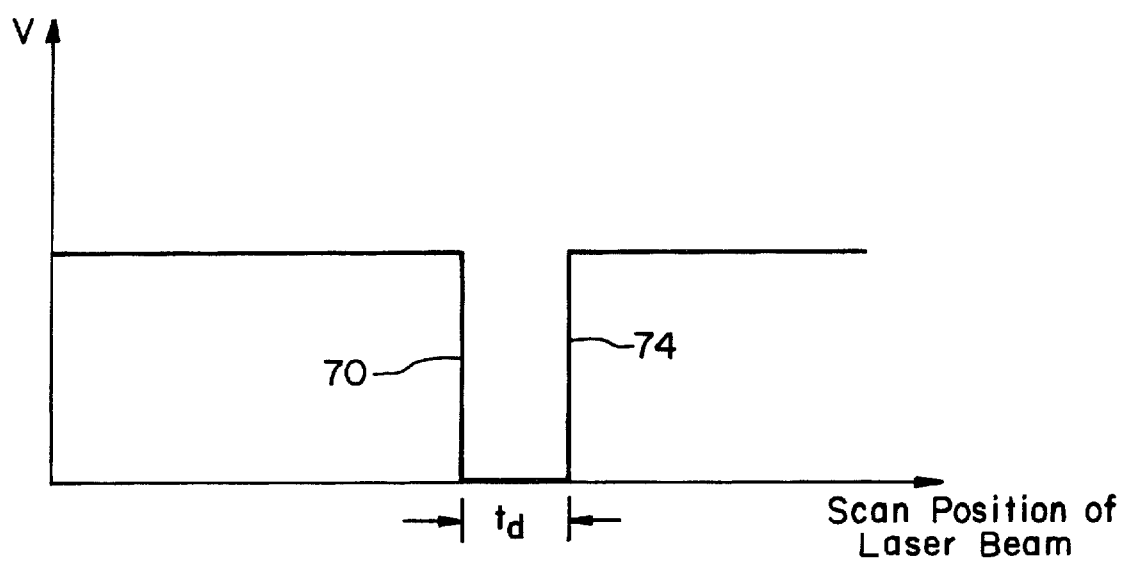
FIG. 3 is a plot of an output voltage produced by the sensor device of FIG. 2 when a laser beam is scanned across it.

One embodiment of a sensor device 56 is shown in FIG. 2 as viewed in the direction of laser beam 38. Sensor device 56 includes a receiving surface 64 which, while being impinged upon by laser beam 38 moving in scanning direction 66, transmits a voltage signal (FIG.3) to a microcontroller 68 on a sign path 69. A leading edge 70 of the voltage signal is caused by laser beam 38 intersecting a leading edge 72 of receiving surface 64. Similarly, trailing edge 74 of the voltage signal is caused by laser beam 38 intersecting a trailing edge 76 of surface 64. Sensor 56 is provided on a rigid frame 77, illustrated schematically in FIG. 1. Frame 77 supports at least one of photoconductive drums 28, 30, 32, 43, and at least one of printheads 12, 14, 16, 18.

A time duration $t_d$ between the leading and trailing edges of the voltage signal which is sent from circuits 93 and 100 to microcontroller 68 varies with the position of laser beam 38 along process direction 46. As is evident from FIG. 2, the width of receiving surface 64 increases along process direction 46. Thus, given a constant speed of the impingement point of laser beam 38 across receiving surface 64 in scanning direction 66, laser beam 38 will take a longer period of time to traverse the width of receiving surface 64 the further laser beam 38 is along process direction 46. By measuring time duration td of the voltage signal between leading edge 70 and trailing edge 74, microcontroller 68 can determine the position of laser beam 38 along process direction 46. Of course, the position of laser beam 38 along scanning direction 66 at the location of this sensor relative to the HSYNC sensor is also determined when laser beam 38 intersects leading edge 72 of surface 64, the position of which is fixed.

Instead of calculating a position of laser beam 38 along process direction 46 for each time duration $t_d$ of the voltage signal, microcontroller 68 may use a look up table which describes the position of laser beam 38 along process direction 46 for selected values of time duration $t_d$. Microcontroller 68 can then interpolate between the values of the look up table in order to calculate the exact position of laser beam 38 along process direction 46. Of course, a separate look up table must be used for each possible scanning speed of laser beam 38.

Due to saturation of sensor device 56 by amplification of the laser beam, the time duration $t_d$ of the voltage signal may also be a function of the optical power of the laser beam. Thus, the optical power of the laser beam must be held constant during a scan along direction 66 and between scans. Else, the optical power of laser beam 38 has to be factored into the calculation of the process location of laser beam 38.

Figure 4:
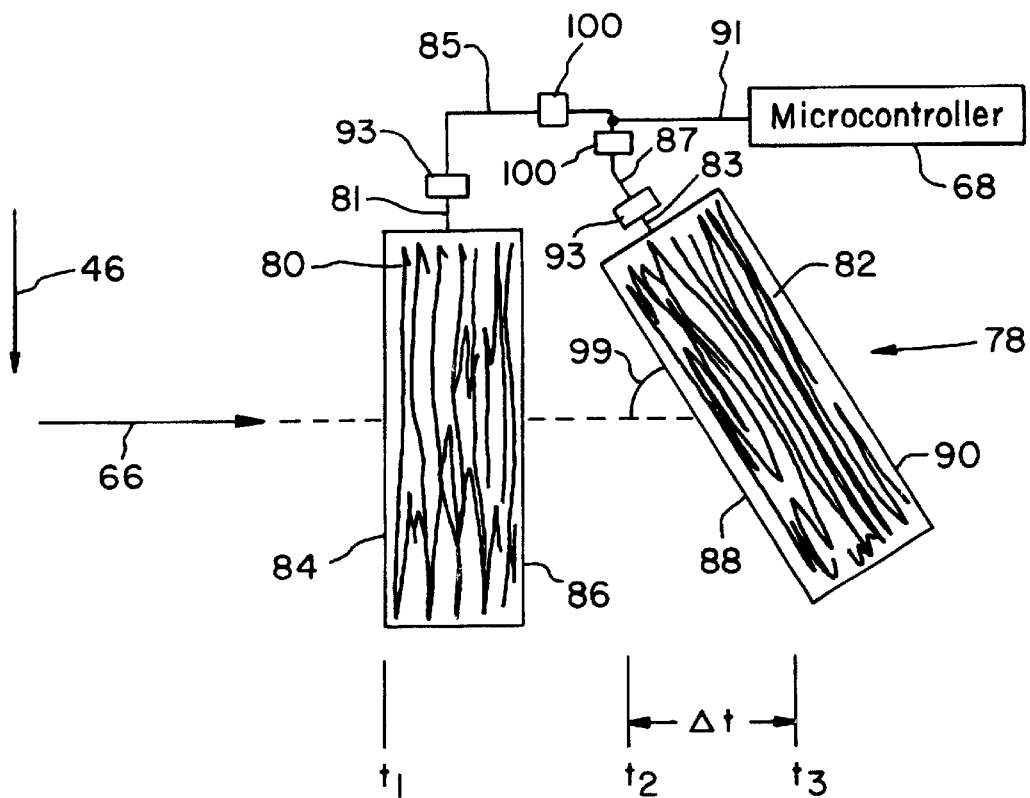
FIG. 4 is a schematic view of another embodiment of the sensor device of the present invention.
Figure 5:
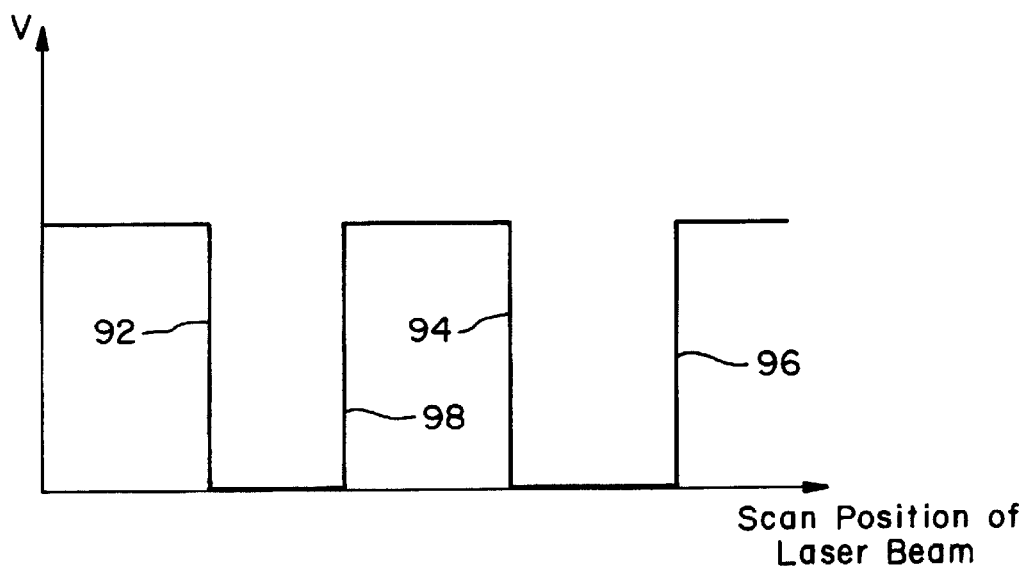
FIG. 5 is a plot of the output voltage of the sensor device of FIG. 4 when a laser beam is scanned across it.

Another embodiment of a sensor device 78 (FIG. 4) includes two separate photosensitive sensor receiving surface portions 80 and 82. Sensor portion 80 has a standard HSYNC configuration, with both leading edge 84 and trailing edge 86 being perpendicular to scanning direction 66. Portion 82, however, is oriented at an angle such that leading edge 88 and trailing edge 90 are parallel to each other, but are nonparallel to leading edge 84 and trailing edge 86 of portion 80. With laser beam 38 scanning in direction 66 and intersecting leading edge 84 at time $t_1$, a time at which laser beam 38 intersects leading edge 88 varies between $t_2$ and $t_3$ depending upon a process position of laser beam 38 along process direction 46.

Receiving surface portions 80 and 82 produce respective photocurrent signals on signal paths 81 and 83 that are converted to respective voltage signals 85 and 87 by transimpedance amplifiers 93. These voltage signals 85 and 87 are merged on common signal path 91 by connecting the open collector outputs of buffer comparators 100. The common signal path 91 (known in the art as a hard-wired logic gate) is connected to microcontroller 68. Microcontroller 68 can then measure a time duration between laser beam 38 intersecting either of leading edge 84 and trailing edge 86 and laser beam 38 intersecting either of leading edge 88 or trailing edge 90. That is, microcontroller 68 can measure a time duration between falling edge 92 and either of falling edge 94 or rising edge 96. Alternatively, microcontroller 68 can measure a time duration between rising edge 98 and either of falling edge 94 or rising edge 96. This embodiment has the advantage that the more stable leading edge may be used for each sensor to determine the time interval related to beam process location.

With each of sensor portions 80 and 82 having a fixed width in scanning direction 66, microcontroller 68 can calculate a speed of laser beam 38 based upon the time duration of either of the two pulses in the voltage signal. Thus, only one look up table, applicable for each possible scanning speed of laser beam 38, is needed to calculate the process position of laser beam 38 in direction 46. Such a look up table could, for example, provide a list of values of the process distance as a function of the change in the time duration between falling edges 92 and 94. Alternatively, such a look up table could provide a list of values of the time duration between falling edges 92 and 94 as a percentage of the time duration of the first pulse between falling edge 92 and rising edge 98.

At initial factory set up, an initial time difference $t_{d0}$ equal to the time duration between falling edges 92 and 94 is stored in the printer non-volatile random access memory. If, during operation, laser beam 38 drifts to a new process location, this change in location $\Delta y$ can be determined using the new time duration td, either from this look up table or from the following equation:

$$\Delta y = K(t_d - t_{d0}),$$

wherein K is the gain describing the characteristics of the relationship between the process direction location and the time $t_d$ between the leading edges 92 and 94. For example, if the angle 99 (FIG. 4) is a constant 45°, then $$K = \tan 45°.$$

If this angle 99 were to vary over the length of edge 88, then K would become a function of time duration $t_d$.

The above-described process can be repeated for each of the other laser beams 40, 42 and 44 in order to determine drift in their respective positions in process direction 46. The process positions of one or more of laser beams 38, 40, 42 and 44 can then be adjusted such that each of the colors of laser printer 10 can be printed in alignment along process direction 46.

The sensors are shown as producing signals with "negative logic." However, it is to be understood that the voltage signals can also be "positive logic." That is, the signals may be positive pulses with rising edges in place of falling edges 70, 92, 94, and with falling edges in place of rising edges 74, 96, 98.

In the embodiments shown, each of the leading and trailing edges of the sensor device are linear. However, it is to be understood that it is also possible for the leading and trailing edges of the sensor device to be non-linear, such as curved. Microcontroller 68 must factor in the particular geometry of the sensor device when calculating the process position of the laser beam.

The present invention has been described herein as being used in conjunction with a laser printer. However, it is to be understood that it is possible for the present invention to be used in conjunction with any type of electrophotographic printer.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which falls within the limits of the appended claims.

What is claimed is:

1. An apparatus for determining a position of a laser beam in an electrophotographic machine, said apparatus comprising:
    a sensor device including a laser beam receiving surface having a first edge, a second edge and a third edge, said second edge being opposite from and nonparallel to said first edge, said third edge being parallel to said first edge, said sensor device being configured for transmitting at least one signal indicative of the laser beam intersecting said first edge, said second edge and said third edge during a scan of the laser beam in a scan direction; and
    a controller device configured for:
        receiving said at least one signal,
        measuring a first time period between said laser beam intersecting said first edge and said second edge,
        measuring a second time period between said laser beam intersecting said third edge and said first edge, and
        determining the position of the laser beam along a process direction substantially perpendicular to said scan direction, said determining being based upon a ratio between said measured first time period and said measured second time period.

2. The apparatus of claim 1, wherein said receiving surface includes a first photosensitive portion associated with said first edge and a second photosensitive portion associated with said second edge, said first photosensitive portion being separate from said second photosensitive portion.

3. The apparatus of claim 2, wherein said at least one signal comprises a plurality of signals, said controller device being configured for receiving each of said signals on a same signal path.

4. The apparatus of claim 1, wherein said receiving surface is a continuous photosensitive surface between said first edge and said second edge.

5. The apparatus of claim 1, wherein said sensor device is disposed in a laser printhead assembly of the electrophotographic machine.

6. The apparatus of claim 1, wherein said sensor device is provided on a rigid frame, said frame supporting at least one photoconductive drum and at least one printhead for producing the laser beam.

7. The apparatus of claim 1, wherein said first edge comprises a leading edge, said second edge comprising a trailing edge.

8. The apparatus of claim 7, wherein said leading edge is substantially linear and oriented substantially parallel to the process direction.

9. The apparatus of claim 8, wherein said trailing edge is substantially linear.

10. A method of determining a position of a laser beam in an electrophotographic machine, said method comprising the steps of:
    providing a sensor device including a laser beam receiving surface having a first edge, a second edge and a third edge, said second edge being opposite from and nonparallel to said first edge, said third edge being parallel to said first edge;
    scanning the laser beam in a scan direction across said sensor device;
    measuring a fist time period between said laser beam intersecting said first edge and said second edge;
    measuring a second time period between said laser beam intersecting said third edge and to said first edge, and
    determining the position of the laser beam along a process direction substantially perpendicular to said scan direction, said determining being based upon a ratio between said measured first time period and said measured second time period.

11. The method of claim 10, wherein said determining step includes using a look up table.

12. The method of claim 11, wherein said look up table is applicable for each of a plurality of scanning speeds of said laser beam.

* * * * *